Feb. 14, 1939.   J. H. McLEOD ET AL   2,146,905
OPTICAL SYSTEM
Filed Oct. 7, 1936   3 Sheets-Sheet 1

Fred E. Altman
John H. McLeod
INVENTORS

BY
ATTORNEYS

Feb. 14, 1939.　　　J. H. McLEOD ET AL　　　2,146,905
OPTICAL SYSTEM
Filed Oct. 7, 1936　　　3 Sheets—Sheet 2
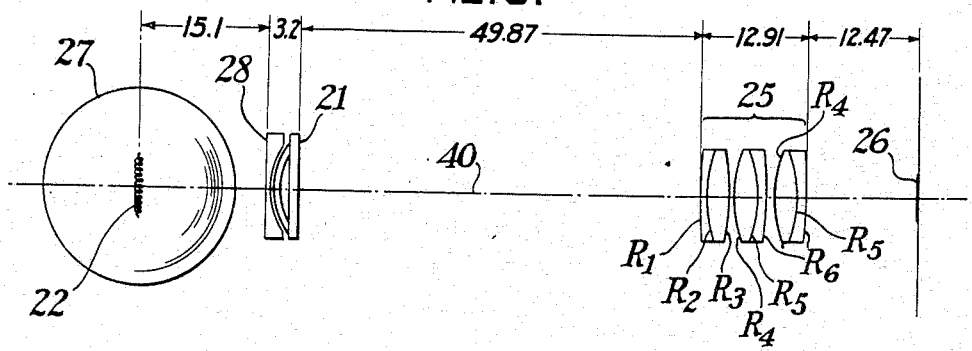
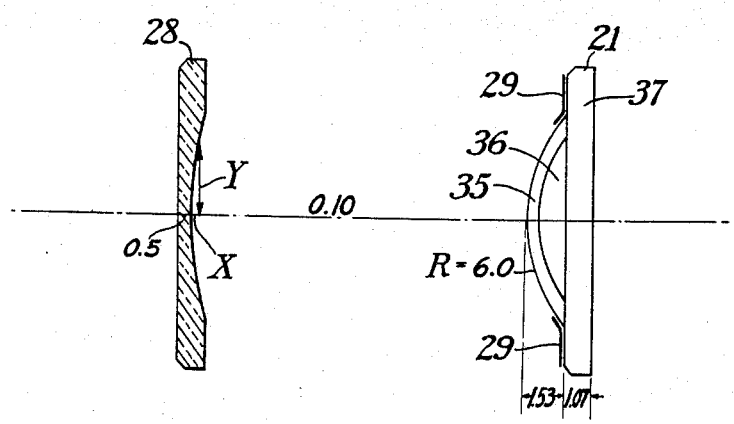
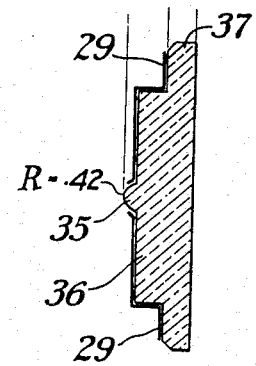
Fred E. Altman
John H. McLeod
INVENTORS
BY
ATTORNEYS Feb. 14, 1939.   J. H. McLEOD ET AL   2,146,905
OPTICAL SYSTEM
Filed Oct. 7, 1936   3 Sheets-Sheet 3
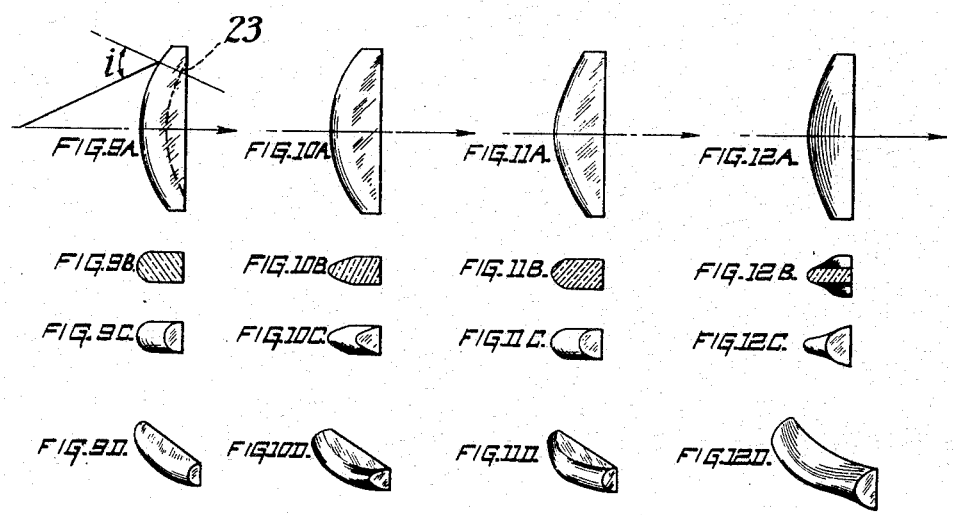
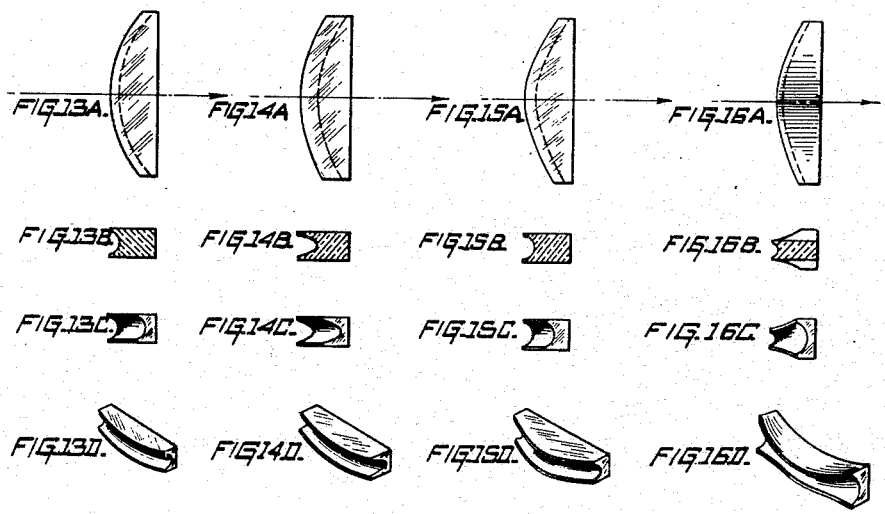
Fred E. Altman
John H. McLeod
INVENTORS
BY
ATTORNEYS Patented Feb. 14, 1939

2,146,905

UNITED STATES PATENT OFFICE 2,146,905

OPTICAL SYSTEM

John H. McLeod and Fred E. Altman, Rochester, N. Y., assignors to Eastman Kodak Company, Rochester, N. Y., a corporation of New Jersey Application October 7, 1936, Serial No. 104,445

8 Claims. (Cl. 88—24)

This invention relates to optical systems and particularly to optical systems of the type used in the recording of sound records on photographic film and in the reproduction of sound therefrom. In recording or reproducing sound-on-film records it is customary to employ an optical system which includes a linear source of light such as a lamp filament or an illuminated slit and a lens or series of lenses to project an image of this source onto the film in the form of a short line of light. For recording purposes, the intensity or dimensions of this image is modulated in accordance with the sound waves which are being recorded. A similar optical system is used in the reproduction of sound from the finished sound track so recorded. In this case, the light striking the sound track is transmitted thereby and falls on a photo-electric cell which together with its accompanying electrical circuit translates the intensity variations into audible sounds.

In describing our invention, we shall, for the sake of clarity, confine ourselves to optical systems primarily intended for the reproduction of sound records. However, it is to be understood that the principles involved may be similarly incorporated in a recording system.

An object of this invention is to provide an optical system which will receive light from a linear source and project onto the film a straight, intense, and uniform line of light of reduced relative width.

In optical systems of this type, it is desirable to use a wide aperture objective. As is well known, the curvature of field of such objectives cannot conveniently be eliminated. It is a particular object of this invention to provide a means for receiving light from a linear source and forming a curved image which acts as a secondary source of light for the wide aperture objective and which has a curvature substantially matching that of the image field of the objective. Thus, the final image as refocused onto the film by the objective will be linear and flat.

It has previously been proposed to employ a curved slit unit or a curved virtual image of a plane slit unit to provide a flat line image with an objective having a curved field. For example, U. S. Patent 2,043,916, Altman, one of the present inventors, discloses an optical system comprising a negative cylindrical lens for producing a curved linear virtual image of a flat slit. It is a particular object of the present invention to provide an optical unit which, in addition to forming a curved linear secondary source of light to be imaged by the above-mentioned objective, will also act as a condenser so that the light reaching the objective will fill its entrance pupil.

Other objects and advantages of the present invention will become apparent from the following description when read in connection with the accompanying drawings in which:

Figure 1 in illustrating one form of this invention in perspective, shows the principle thereof which involves the use of a toric lens.

Figure 4 is a cross section of an arrangement whose plan would appear identical with Figure 2.

Figure 5 shows in detail another form of this invention.

Figure 6 is an enlarged view of the lens 28 in Figure 5, which has an aspherical surface.

Figure 7 is an enlarged view of the toric component 21 of Figure 5.

Figure 8 is a cross section of Figure 7.

Figures 9 to 16, show several forms of the principal portion of the toric component. The A, B, C and D parts of each of these figures show respectively, the plan, the central section, the end elevation and a perspective view of this portion of the toric component.

Figure 9 is a plano-toric lens whose major and minor curvatures are circular and positive (i. e. convex to the incident light).

Figure 10 is a plano-toric lens which differs from that shown in Figure 9 by having an aspherical minor curvature.

Figure 11 is a plano-toric lens which differs from that shown in Figure 9 by having an aspherical major curvature.

Figure 12 is a plano-toric lens whose minor curvature varies as one proceeds along the major meridian. In this particular figure, the minor radius decreases toward the paraxial region of the lens.

Figure 13 is a plano-toric lens which differs from that shown in Figure 9 by having a negative minor curvature.

Figure 14 is a plano-toric lens which differs from that shown in Figure 10 by having a negative minor curvature.

Figure 15 is a plano-toric lens which differs from that shown in Figure 11, by having a negative minor curvature.

Figure 16 is a plano-toric lens which differs from that shown in Figure 12, by having a negative minor curvature.

For clarity, we shall define certain terms as we are using them in the present description of our invention. A toric lens is one in the form of a tore or torus. As shown in the accompanying drawings, we use the term, toric more broadly to describe a lens bounded on at least one side by a surface which is substantially toric. A circle rotated about a line lying in its own plane generates a tore having the radius of the circle as its minor radius. The major radius is the distance from the center of the generating circle to the axis of rotation plus the minor radius which may be positive or negative. Thus the term, major radius applies to the meridian of the tore which is perpendicular to the minor meridian. We use the terms, major radius and minor radius, as thus defined, and we call the corresponding curvatures major and minor curvatures.

Thus, the major and minor curvatures are the optically weakest and the optically strongest ones respectively.

For convenience, we use the terms, horizontal and vertical, to refer to directions respectively parallel and perpendicular to the plane defined by the optic axis and the axis of the source of light. However, it is to be understood that these terms are merely mutually relative and do not necessarily refer to the actual orientation in space.

Figure 1:
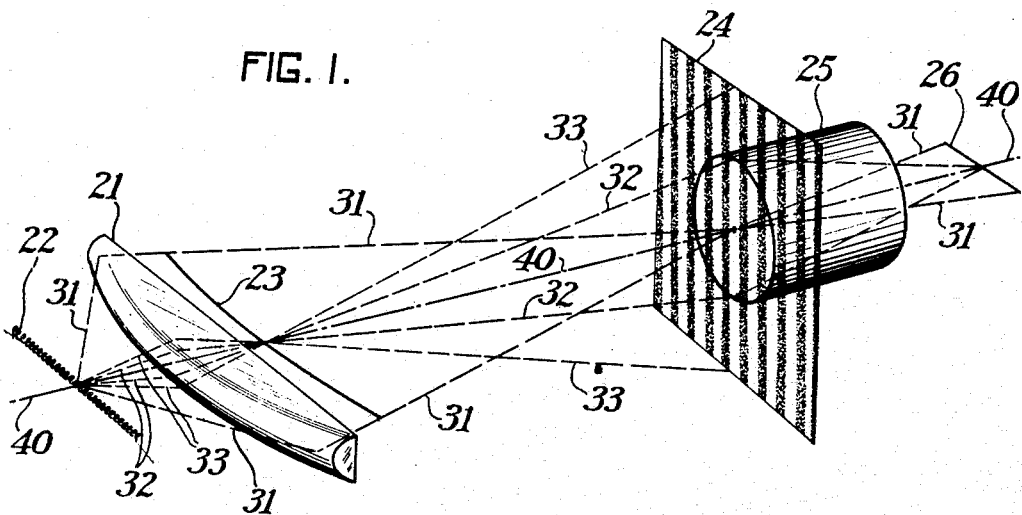

Our invention will more easily be understood by reference to Figure 1 in which a linear source of light 22, arbitrarily assumed to be horizontal, is focused by means of an optical system comprising a toric lens 21 and an objective 25 to form a line of light 26 which is particularly suitable in connection with the reproduction of sound from an optical sound track. The toric lens 21 which is shown plano-convex, focuses the light from the source 22 to form two astigmatic images, the first of which is a horizontal curved line of light 23 which acts as a secondary source of light and which is so shaped that it substantially matches the image field of the objective 25. Thus, the final image 26 is flat.

The major curvature of the plano-toric lens 21 performs two functions which are important features of this invention. First, it determines the curvature of the secondary source of light 23. Second, it acts as a cylindrical condenser (the rear surface of the component being plano) and forms the second of the astigmatic images referred to previously labeled 24, substantially in the entrance pupil of the objective 25. The dimensions of this second astigmatic image 24 will be discussed in detail below. It may happen that the curvatures required to perform each of these two functions are substantially equal or a curvature may be chosen which satisfies both requirements within certain tolerance limits and which is satisfactory practically. An alternative arrangement which will be described below and which is shown in Figure 5, provides a means for compensating for any error which exists in the condensing action when the major curvature of the toric is chosen to give the desired shape to the secondary source 23. In Figure 1, the light rays represented by the broken lines 31 indicate the condenser action of the plano-toric lens 21. The light rays indicated by the broken lines 32 indicate the formation of the secondary source 23 which is refocused by the objective 25 to give the final image 26. The light rays indicated by the broken lines 33 also assist in the formation of the secondary source 23 but fall outside of the objective 25. These rays 33 are defined by the vertical aperture of the toric lens 21 and determine the vertical limits of the second astigmatic image 24. The horizontal limits of the image 24 depend on several factors including the length of the source of light 22; the major curvature of the toric lens 21 and the object and image distance with respect to the lens 21.

The dimensions of the final image 26 are determined by the dimensions of the first astigmatic image 23 which depend on the power and horizontal aperture of the toric lens 21. The light source 22, the major meridian of the plano-toric lens 21, the secondary source 23, and the final image 26 all pass through the optic axis 40 and are substantially in the same horizontal plane.

Figure 2:
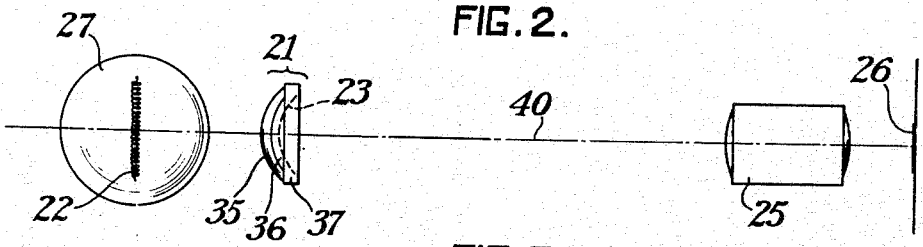
Figure 2 shows a somewhat similar arrangement schematically.
Figure 3:
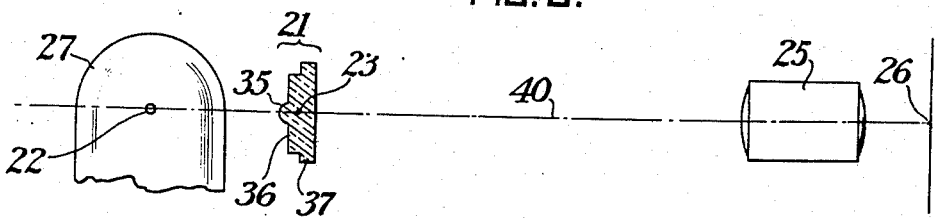
Figure 3 is a cross section of the arrangement shown in Figure 2.

Figures 2 and 3 show a suitable lamp 27 having a linear filament or a closely coiled helical filament 22 located approximately on and with its axis approximately perpendicular to the optic axis 40 of the system. The curved linear image which acts as the secondary source is shown as the broken line 23. The toric component 21 may be considered as comprising three separate sections 35, 36 and 37, but for convenience in manufacture, the whole component is made from one piece of glass. The toric section 35 is in contact with a cylindrical plano section 36 which is in turn integrally joined to a plane piece of glass, 37. The portions of sections 36 and 37 which extend above and below the toric section 35 are merely provided as a convenient base and light is prevented from reaching these portions by means of opaque shields of any convenient material such as lacquer or pressed sheet metal.

These shields 29 shown in Figures 7 and 8 extend over a portion of the toric section 35 and define the aperture thereof. As we pointed out above, the height of the second astigmatic image 24 is determined by this aperture. We have found that it is desirable to have this second astigmatic image 24 large enough to completely fill the entrance pupil of the objective 25 and to be greater than it both vertically and horizontally for the following reasons.

The position and orientation of the first astigmatic image 23 depends primarily on the position and orientation of the toric lens 21 and is practically unaffected by slight movement or vibration of the lamp filament 22. Hence, the intensity and position of the final image 26 is not critically dependent on the position of the lamp filament 22, provided that the height of the second astigmatic image 24 as defined by the rays 33 and as determined by the vertical aperture of the toric lens 21, is large enough to cover and completely fill the entrance pupil of the objective 25 at all times even when said image vibrates vertically with the mechanical vibration of the filament 22. Microphonics which would otherwise be objectionably introduced into the sound system, are thereby eliminated or at least greatly minimized, without reducing the working aperture of the objective.

The horizontal dimension (width) of this second astigmatic image 24 is such that the portion of the light, coming from those parts of the original source 22 which are normally below its average intensity (i. e. the cooler ends of the lamp filament) will fall outside of the objective. Thus, an optical system is provided which is highly efficient for the reproduction of optical sound records. Due to the coils of the filament 22 the second astigmatic image 24 has a fluted appearance as indicated by the shaded bands.

The real image 23 which is formed by the minor curvature of the toric lens 21 is of comparatively uniform intensity since the individual coils of the helical filament 22 are not distinguishable in this image. The variation in this intensity which does exist will be described below in connection with Figures 9 to 16. In Figure 2, the image 23 is shown formed in glass. Depending on the thickness and shape of the toric component, it may alternatively be formed in air as shown in Figure 1. In any case, the curvatures of the toric element are such as to form an image whose curvature approaches that of the image field of the objective 25 at that point whether it be in glass, or air, or partially in each.

Figure 4:
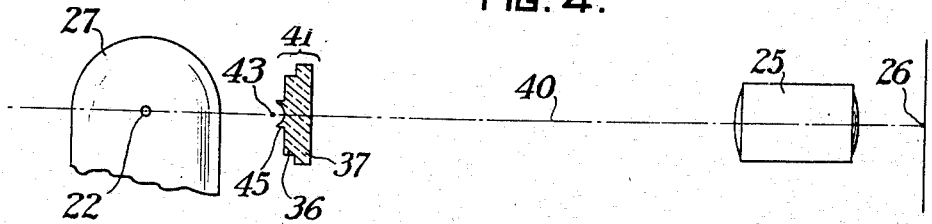
Figure 4 illustrates one alternative arrangement of our invention in which a toric lens of negative power is used.

As shown in Figure 4, the power of the minor curvature of the toric lens, which in this figure is labeled 41, may be negative. The image formed in this case is virtual, and passes through the optic axis 40 at the point 43. As in the previous case, it constitutes a secondary source for the objective 25. The negative toric section 45 of the toric lens 41 may be formed on and outside of the surface of the cylindrical plano section 36 as shown in the drawings, or it may comprise merely a depression in said surface. The virtual image formed in this case is very different from that described in the Altman patent mentioned heretofore, and may be readily distinguished therefrom by the fact that in the present invention, the curvature of the image is due to the positive major curvature of the torical lens and is independent of the fact that the image itself is virtual.

While it is to be understood that our invention may take several forms, the details of one particular form which we have found to be satisfactory are shown in Figures 5, 6, 7, and 8. In this particular case, it is not possible to choose a major curvature for the toric component which will provide both a correct curvature to the secondary source 23, (i. e. the first astigmatic image) and a second astigmatic image 24 free from spherical aberration in the entrance pupil of the objective 25. Therefore, an auxiliary lens 28 having an aspherical surface is introduced immediately in front of the toric component 21 to cooperate with it in performing its two primary functions as described previously. The aspherical component 28 is primarily designed to correct the condenser action of the toric lens and has a negligible effect on the curvature of the image 23 employed as the secondary source.

Figure 6 is an enlarged view of this aspherical component. Since the effect of this component is practically confined to the horizontal plane of the major curvature of the toric lens, the aspherical surface may be cylindrical with its cylindrical axis vertical.

Figure 7 is an enlarged view of the toric component. Figure 8 is a cross section of Figure 7.

In Figure 5, the objective 25 comprises three components each of which is a positive element cemented to a negative element. Each of the positive elements is made from glass having a refractive index for the D line ($N_D = 1.52$) and a V value 64.6. Each of the negative elements is made from glass in which $N_D = 1.62$ and $V = 36.6$. The curvatures of the surfaces of the first component are as follows: $R_1 = +75.9$ mm., $R_2 = +20.8$ mm., $R_3 = -32.4$ mm. The second and third components are identical having curvatures as follows: $R_4 = +13.9$ mm., $R_5 = -14.8$ mm., $R_6 = +600.0$ mm. A positive sign is used to indicate a surface which is convex to the incident light. The objective as a whole has an effective focal length of 13.5 mm.

This particular objective forms the subject matter of a copending application Serial Number 173,217, filed November 6, 1937, by Fred E. Altman, one of the present inventors. In common with practically all extremely high speed objectives, this lens has an inwardly curved image field. The present invention is intended for use with any objective having a curved field.

The toric lens 21 has a minor curvature of .42 mm. and a major curvature of 6.0 mm. The aspherical component 28 for use with this toric component 21 and this objective 25, as shown in Figure 6, has an axial thickness of 0.5 mm. The shape of its aspherical surface is described in the terms of cartesian coordinates shown as X and Y in the drawings and as given in the following table:

| Y mm. | X mm. | Y mm. | X mm. | Y mm. | X mm. |
|---|---|---|---|---|---|
| 0.25 | .0001 | 1.75 | .016 | 2.75 | .085 |
| 0.50 | .0003 | 1.80 | .018 | 2.80 | .092 |
| 0.75 | .0008 | 1.90 | .022 | 2.90 | .108 |
| 1.00 | .0015 | 2.00 | .026 | 3.00 | .130 |
| 1.10 | .0030 | 2.10 | .030 | 3.10 | .150 |
| 1.20 | .0040 | 2.20 | .036 | 3.20 | .178 |
| 1.25 | .0050 | 2.25 | .039 | 3.25 | .195 |
| 1.30 | .0060 | 2.30 | .042 | 3.30 | .214 |
| 1.40 | .0080 | 2.40 | .050 | 3.40 | .260 |
| 1.50 | .0100 | 2.50 | .058 | 3.50 | .318 |
| 1.60 | .0125 | 2.60 | .068 | 3.60 | .386 |
| 1.70 | .0150 | 2.70 | .080 | | |

Figures 9 to 12 show four of the forms which the principal portion of the toric lens may take.

In general, the image field of the objective 28 does not have purely circular curvature. To provide a secondary source of light having a curvature which exactly matches the field of the objective, we prefer to use a toric lens whose major curvature is non-circular as shown in Figure 11. We speak of such a toric lens as one having an aspherical major curvature. This major curvature is usually positive (convex to the incident light) since objectives which are suitable for use in optical systems of this type are unfortunately those which inherently suffer from an inwardly curved image field. However, if necessary, the major curvature may be negative.

Figure 9 shows a toric element whose minor curvature is circular. U. S. Patent 2,047,244, Altman, discusses the advantages of an aspherical cylindrical plano lens in forming a flat line image. This feature may also be incorporated in the present invention by using a toric lens having a non-circular minor curvature as shown in Figure 10.

Figure 12 illustrates a very desirable arrangement of our invention. In this particular figure, both the major and minor curvatures are circular although either or both may be non-circular if desired. However, the important feature is that the minor curvature varies as one proceeds along the major meridian. In Figure 12, the minor radius of curvature increases with the distance of departure from the optic axis; (i. e. with azimuth measured from the optic axis along the major medidian).

A toric lens having constant minor curvature as shown in Figure 9, produces a curved linear image 23 which becomes slightly narrower as one proceeds away from the optic axis. Also, the distance between the major meridian of the toric lens 21 and the image 23 decreases with increasing azimuth. Both of these changes with azimuth are due to the increased distance from the source of light to the marginal surface of the lens and to the fact that the incident light from any one point of the source 22 strikes said surface at an angle which is marked (i) in Figure 9, and which increases with azimuth. By way of further explanation, we point out that the effective power of the minor curvature increases with the increasing value of the angle (*i*). In addition to these changes in width and curvature, the intensity of the image 23 also falls off with increasing azimuth, due at least partially to the increased reflection losses as the angle (*i*) increases.

By increasing the marginal minor radius of curvature relative to the paraxial minor radius of curvature as shown in Figure 12, the width and hence the luminous flux per unit length of the marginal portions of the curved image are increased. Also, the radius of curvature of the secondary source 23 is decreased slightly. Each of these changes is individually desirable. It is a happy coincidence that they are accomplished simultaneously. The rate of change of minor radius of curvature along the major meridian may be such as to give an image having substantially uniform width and almost uniform luminous flux per unit length. We prefer to choose a slightly greater rate of variation for the minor radius of curvature so that the resultant curved image is satisfactorily uniform both in width and intensity. The choice of this rate of variation is also determined to some extent by its effect on the curvature of the secondary source 23.

Figures 13 to 15 correspond to Figures 9 to 12 respectively and differ therefrom by having a negative minor curvature.

We have pointed out that the major curvature of the toric element may be circular or aspherical, positive or negative, and that the minor curvature may be circular or aspherical, constant or variable, positive or negative, provided that the images formed thereby sufficiently conform to the image field and the entrance pupil of the objective with which said toric element is to be used. Various combinations of these will immediately suggest themselves to those skilled in the art.

Having thus described in detail various arrangements which our invention may take, we wish to point out that it is not limited to the specific structure shown, but is of a scope defined by the appended claims.

What we claim and desire to secure by Letters Patent of the United States is:

1. An optical system for producing a flat uniformly intense line of light of uniform width suitable for use in sound recording or sound reproduction, comprising a horizontal linear source of light, a wide aperture objective having an inwardly curved image field and a toric lens positioned to receive light from said source and to focus it to form two astigmatic images the first of said astigmatic images being a horizontal curved line substantially in said inwardly curved image field having a width which is reduced relative to said source, the second of said astigmatic images being substantially in the entrance pupil of said objective and having an area greater than said entrance pupil.

2. An optical system for producing a flat uniformly intense line of light of uniform width comprising a horizontal linear source of light an objective having an inwardly curved image field and a toric lens positioned to receive light from said source and to focus it to form two astigmatic images, the one due to the stronger and minor curvature of said toric lens being a horizontal curved line substantially in said inwardly curved image field, the width of said curved line being reduced relative to said source and having predetermined uniformity, the second astigmatic image being substantially in the entrance pupil of said objective, the minor radius of curvature of said toric lens being varied with azimuth measured along the major meridian.

3. An optical system for producing a flat uniformly intense line of light comprising a horizontal linear source of light, an objective having an inwardly curved image field, a toric lens between said source and said objective, and an auxiliary lens also between said source and said objective to cooperate with said toric lens in forming two astigmatic images of said source, the first of said astigmatic images being a horizontal curved line substantially in said image field and the second of said astigmatic images being substantially free from spherical aberration and located in the entrance pupil of said objective.

4. An optical system for producing a flat uniformly intense line of light comprising a linear source of light, a wide aperture objective having a curved image field, a toric lens between said source of light and said objective, arranged to receive light and to form a curved linear image which acts as a secondary light source for said objective and which has a curvature approximately matching that of the image field of said objective, and an aspherical cylindrical plano lens with its cylindrical axis perpendicular to the plane of the major meridian of said toric lens, said aspherical lens being positioned between said source of light and said toric lens to cooperate with said toric lens.

5. An optical system for producing a flat narrow line of light comprising a toric lens adapted to receive light from a linear source and to focus it in a line lying in the plane of said linear source, and an objective for forming an image of the line focus, the major curvature of said toric lens being collective and convex to the incident light, determining the shape of said focused line and serving as a condenser lens in the direction longitudinal of said focused line and the minor curvature being according to its absolute value at least four times stronger than the major curvature.

6. In an optical system for the reproduction of sound from optical sound records, a source of light, an objective having a curved image field and a toric lens between said source of light and said objective, positioned and shaped to form a linear image matching and substantially coinciding with said image field, the major curvature of said toric lens being non-circular.

7. An optical slit unit including a lens having a toric refracting surface comprising major and minor curvatures, the minor curvature varying with azimuth measured along the meridian of the major curvature whereby when the lens is placed in operative relation with a linear light source it will produce a curved linear image of light having an intensity distribution determined by the variation in the minor curvature of the lens.

8. An optical slit unit including a lens comprising a toric refracting surface having a major curvature and a minor curvature, the radius of the minor curvature increasing with increasing azimuth measured from the optic axis along the major meridian so that when placed in operative relation with a linear light source it will produce a linear image having a marginal intensity substantially equal to its paraxial intensity.

JOHN H. McLEOD.
FRED E. ALTMAN.